United States Patent
Yoshida et al.

(10) Patent No.: US 6,335,117 B1
(45) Date of Patent: Jan. 1, 2002

(54) NONAQUEOUS ELECTROLYTE BATTERY HAVING HERMETICALLY SEALED TERMINALS

(75) Inventors: Hiroaki Yoshida; Shinya Kitano; Takefumi Inoue, all of Kyoto (JP)

(73) Assignee: Japan Storage Battery Co., Ltd., Kyoto (JP)

(*) Notice: Subject to any disclaimer, the term of this patent is extended or adjusted under 35 U.S.C. 154(b) by 0 days.

(21) Appl. No.: 09/369,461

(22) Filed: Aug. 6, 1999

(30) Foreign Application Priority Data

Aug. 7, 1998 (JP) .................................. 10-224311
Aug. 7, 1998 (JP) .................................. 10-224312
Aug. 7, 1998 (JP) .................................. 10-224313

(51) Int. Cl.$^7$ ........................................ H01M 2/06
(52) U.S. Cl. ...................... 429/185; 429/180; 429/181
(58) Field of Search ............................ 429/162, 174, 429/178, 179, 180, 181, 185

(56) References Cited

U.S. PATENT DOCUMENTS

| | | | |
|---|---|---|---|
| 3,421,945 A | | 1/1969 | Michalko .................... 136/6 |
| 4,127,702 A | * | 11/1978 | Catanzarite .................... 429/56 |
| 4,252,873 A | * | 2/1981 | Epstein et al. ................ 429/181 |
| 4,264,688 A | * | 4/1981 | Catanzarite ................... 429/163 |
| 4,331,745 A | * | 5/1982 | Catanzarite .................... 429/60 |
| 4,337,302 A | | 6/1982 | Takizawa ...................... 429/181 |
| 5,104,755 A | * | 4/1992 | Taylor et al. ................. 429/181 |
| 5,397,661 A | * | 3/1995 | Kaun ........................... 429/181 |

OTHER PUBLICATIONS

Patent Abstracts of Japan vol. 006, No. 189(E-133), Sep. 28, 1982 & JP 57 101339 A (Fuji Electrochem Co Ltd) Jun. 23, 1982 *Abstract.

* cited by examiner

Primary Examiner—Carol Chaney
(74) Attorney, Agent, or Firm—Sughrue Mion, PLLC

(57) ABSTRACT

In a nonaqueous electrolyte battery, a negative electrode terminal is fixed to an insulating ceramic material with filler materials for brazing mainly composed of copper and insulation-sealed to an opening of a metallic exterior member with the ceramic material being provided interposed therebetween. A positive electrode terminal fixed to an insulating ceramic material with an aluminum alloy-based filler materials for brazing and insulation-sealed to the opening in the metallic exterior member.

19 Claims, 6 Drawing Sheets

NONAQUEOUS ELECTROLYTE BATTERY HAVING HERMETICALLY SEALED TERMINALS

BACKGROUND OF THE INVENTION

1. Field of the Invention

The present invention relates to a nonaqueous electrolyte battery in which a positive electrode terminal and/or a negative electrode terminal is insulation-sealed to the opening in a metallic exterior member through a ceramic material.

2. Description of the Related Art

In a nonaqueous electrolyte battery, an airtight terminal is provided to connect positive and negative electrodes as electricity-generating elements sealed in the interior of the battery case to the external circuit. As shown in FIG. 4, an example of such a battery is one comprising a positive electrode terminal 1 and a negative electrode terminal 2 insulation-fixed to the battery case, respectively, with a ceramic material 3 provided interposed therebetween. The positive electrode terminal 1 and the negative electrode terminal 2 are each inserted into the respective opening in an external annular metallic member 5 with an annular ceramic material 3 fitted thereon. The positive electrode terminal 1 and negative electrode terminal 2 are each brazed to the ceramic material 3 with filler materials for brazing 4. Further, the ceramic material 3 is brazed to the external annular metallic member 5 with the filler materials for brazing 4. The external annular members 5, 5 are each inserted into the respective opening in a metallic cover 6. These external annular members 5, 5 are each sealed to the opening by welding. The metallic cover 6 is fitted into the upper opening of a metallic container 8 having an electricity-generating element 7 incorporated therein. The metallic cover 6 is sealed to the opening by welding. The positive electrode terminal 1 and the negative electrode terminal 2 are connected to the positive electrode and the negative electrode of the electricity-generating element 7, respectively, at the lower end thereof. Accordingly, the positive electrode and the negative electrode of the electricity-generating element 7 contained in the sealed battery case comprised of a metallic container 8, the metallic cover 6 and the external annular metallic member 5 can be drawn to the exterior of the battery case, respectively, with the positive electrode terminal 1 and the negative electrode terminal 2 insulated by the ceramic material 3.

In a Ni—Cd battery or Ni—MH battery, as the filler materials for brazing 4 for brazing to the ceramic material 3, there has heretofore been used silver filler material or silver-copper filler material (copper content: 15 to 40%). However, the use of such silver filler material or silver-copper filler material in a nonaqueous electrolytic battery is disadvantageous in that, when the filler materials for brazing 4 with which the positive electrode terminal 1 or the negative electrode terminal 2 is brazed to the ceramic material 3 comes in contact with the nonaqueous electrolyte, the filler material undergoes alloying reaction with an alkaline metal or dissolution reaction to corrode. Consequently, air leakage is caused to thereby shorten the cycle life and calendar life.

SUMMARY OF THE INVENTION

It is an object of the present invention to provide a nonaqueous electrolyte battery which has filler materials for brazing coming in contact with the negative electrode terminal a filler material mainly composed of copper and as filler materials for brazing coming in contact with the positive electrode terminal an aluminum alloy based filler material, which filler materials for brazing members are preferably coated with a coating material on the surface thereof which is exposed to the interior of the battery, to prevent the corrosion of the filler materials for brazing more securely.

A first aspect of the present invention concerns a nonaqueous electrolyte battery comprising a negative electrode terminal fixed to an insulating ceramic material with filler materials for brazing mainly composed of copper and insulation-sealed and fixed to the opening in a metallic exterior member with the ceramic material being provided interposed therebetween and/or a positive electrode terminal fixed to an insulating ceramic material with an aluminum alloy-based filler materials for brazing and insulation-sealed to the opening in the metallic exterior member.

The metallic exterior member of the present invention is a member constituting a part of the case of the nonaqueous electrolyte battery, e.g., metallic container, metallic cover and external annular metallic member fitted in the opening in these members.

In accordance with the first aspect of the present invention, a filler material mainly composed of copper, if used as filler materials for brazing coming in contact with the negative electrode terminal, can hardly undergo alloying reaction with lithium or the like, making it possible to prevent corrosion thereof. Further, the use of an aluminum alloy based filler material as filler materials for brazing coming in contact with the positive electrode terminal makes it possible to prevent corrosion due to the dissolution reaction of the filler material even if the filler materials for brazing is at a high potential.

A second aspect of the present invention concerns the foregoing nonaqueous electrolyte battery, wherein the filler materials for brazing mainly composed of copper has a copper content of not less than 50%. In accordance with the second aspect of the present invention, the use of filler materials for brazing having a high copper content makes it possible to prevent air leakage due to the alloying reaction with lithium or the like.

A third aspect of the present invention concerns the foregoing nonaqueous electrolyte battery, wherein the aluminum alloy-based filler material has an aluminum content of not less than 85%. In accordance with the third aspect of the present invention, the use of an aluminum alloy based filler material having a high aluminum content makes it possible to prevent the dissolution reaction of the filler material more securely.

A fourth aspect of the present invention concerns the foregoing nonaqueous electrolyte battery, wherein the negative electrode terminal is made of copper or copper alloy.

A fifth aspect of the present invention concerns the foregoing nonaqueous electrolyte battery, wherein the negative electrode terminal is made of nickel or nickel alloy.

A sixth aspect of the present invention concerns the foregoing nonaqueous electrolyte battery, wherein the positive electrode terminal is made of copper or copper alloy. In accordance with the sixth aspect of the present invention, the positive electrode terminal is made of aluminium or aluminium alloy and thus can be prevented from corroding due to dissolution reaction.

A seventh aspect of the present invention concerns the foregoing nonaqueous electrolyte battery, wherein the filler materials for brazing is coated with a coating material on the surface thereof which is exposed to the interior of the battery. In accordance with the seventh aspect of the present invention, the filler materials for brazing coming in contact with the negative electrode terminal and/or positive electrode terminal is coated with a coating material. Accordingly it is possible to prevent the filler materials for brazing from coming in contact with lithium or the like in the nonaqueous electrolyte and hence prevent corrosion more securely. Further, by coating with the same coating material the filler materials for brazing provided outside the ceramic material which does not come in direct contact with the negative electrode terminal and/or positive electrode terminal, corrosion can be prevented even more securely.

An eighth aspect of the present invention concerns the nonaqueous electrolyte battery according to the seventh aspect of the present invention, wherein the coating material is a polymer. In accordance with the eighth aspect of the present invention, the use of a polymer as a coating material makes it easy to coat the filler materials for brazing. Such a polymer is preferably one which can hardly be dissolved or can hardly swell with the nonaqueous electrolyte. Further, the polymer employable herein may have rubber elasticity.

A ninth aspect of the present invention concerns the nonaqueous electrolyte battery according to the seventh aspect of the present invention, wherein the coating material is a ceramic. In accordance with the ninth aspect of the present invention, the use of a ceramic material having a good corrosion resistance as a coating material makes it possible to prevent the corrosion of the filler materials for brazing more securely. As such a ceramic material, there is preferably used alumina or a ceramic material mainly composed of alumina.

A tenth aspect of the present invention concerns the nonaqueous electrolyte battery according to the seventh aspect of the present invention, wherein the coating material is a ceramic impregnated with a polymer. In accordance with the tenth aspect of the present invention, the impregnation of a ceramic material used as a coating material with a polymer makes it possible to completely prevent the penetration of the nonaqueous electrolyte and thus securely protect the filler materials for brazing. Further, the peeling of the polymer can be prevented.

An eleventh aspect of the present invention concerns the nonaqueous electrolyte battery according to the seventh aspect of the present invention, wherein the coating material is a ceramic coated with a polymer on the surface thereof.

A twelfth aspect of the present invention concerns the nonaqueous electrolyte battery according to the seventh aspect of the present invention, wherein the coating material is a metallic film.

A thirteenth aspect of the present invention concerns the nonaqueous electrolyte battery according to the seventh aspect of the present invention, wherein the coating material is a metallic film formed by plating with Ni or Cu.

A fourteenth aspect of the present invention concerns the nonaqueous electrolyte battery according to the seventh aspect of the present invention, wherein the coating material is prepared by coating with a resin and a metallic film formed by plating with Ni or Cu.

PREFERRED EMBODIMENTS OF THE INVENTION

Preferred embodiments of the present invention will be described accompanying with the attached drawings as follows. The present invention is suitable particularly for secondary nonaqueous electrolyte battery using an alkaline metal as an active material, even more particularly for secondary lithium nonaqueous electrolyte battery. However, the present invention can be widely applied to nonaqueous electrolyte batteries.

Figure 1:
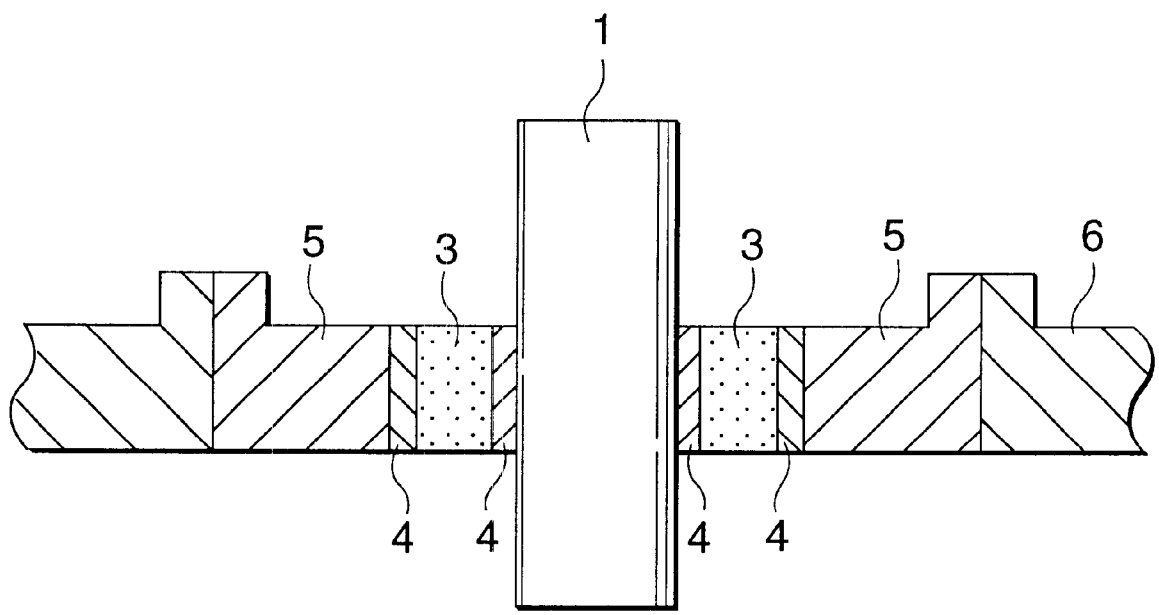
FIG. 1 is a partially enlarged vertical sectional view of the positive electrode terminal of a secondary nonaqueous electrolyte battery illustrating an embodiment of the ceramic hermetic seal according to the present invention.
Figure 2:
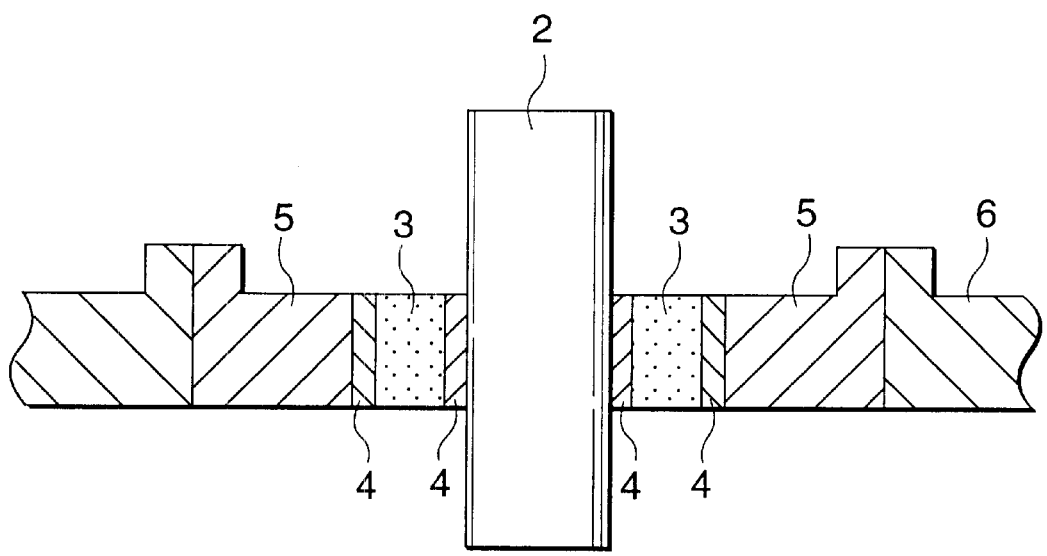
FIG. 2 is a partially enlarged vertical sectional view of the negative electrode terminal of a secondary nonaqueous electrolyte battery illustrating an embodiment of the ceramic hermetic seal according to the present invention.
Figure 3:
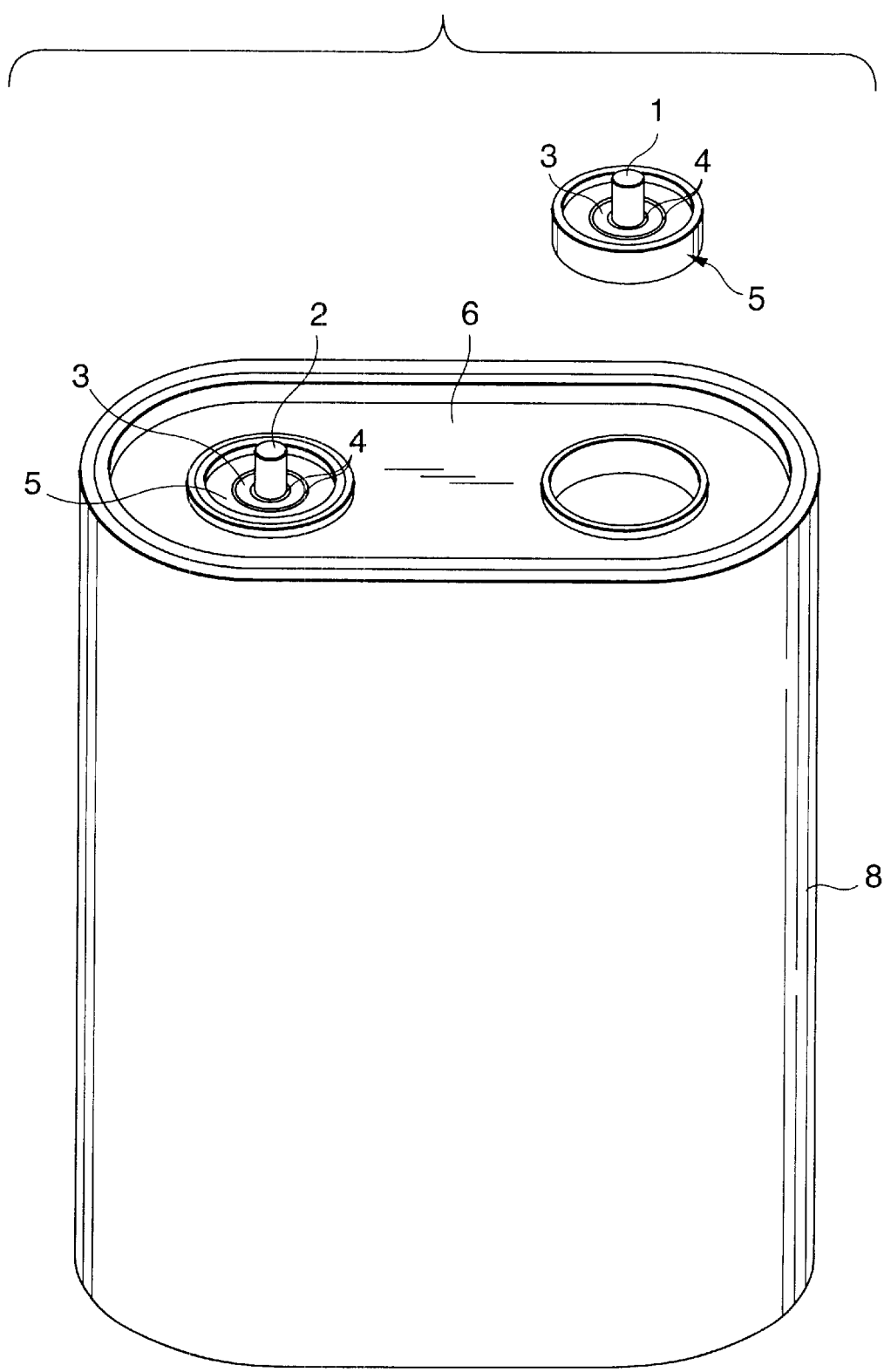
FIG. 3 is a partially exploded perspective view of a secondary nonaqueous electrolyte battery comprising a ceramic hermetic seal illustrating an embodiment of the present invention and a conventional example at the same time.

FIGS. 1 to 3 each illustrate an embodiment of the present invention. FIG. 1 is a partially enlarged vertical section of a positive electrode terminal of a secondary nonaqueous electrolyte battery. FIG. 2 is partially enlarged vertical section of a negative electrode terminal of the secondary nonaqueous electrolyte battery. FIG. 3 is a partially exploded perspective view of the secondary nonaqueous electrolyte battery. The same numerals are used where the constituent members function in the same way as those of FIG. 4, which illustrates a conventional nonaqueous electrolyte battery.

The present embodiment of the present invention will be described with reference to a secondary nonaqueous electrolyte battery having a positive electrode terminal 1 and a negative electrode terminal 2 insulation-sealed to the respective external annular member 5 with a ceramic material 3 provided interposed therebetween, the external annular member 5 being inserted and fixed to the respective opening in a metallic cover 6 of the battery case, similarly to the conventional example shown in FIG. 4.

Figure 4:
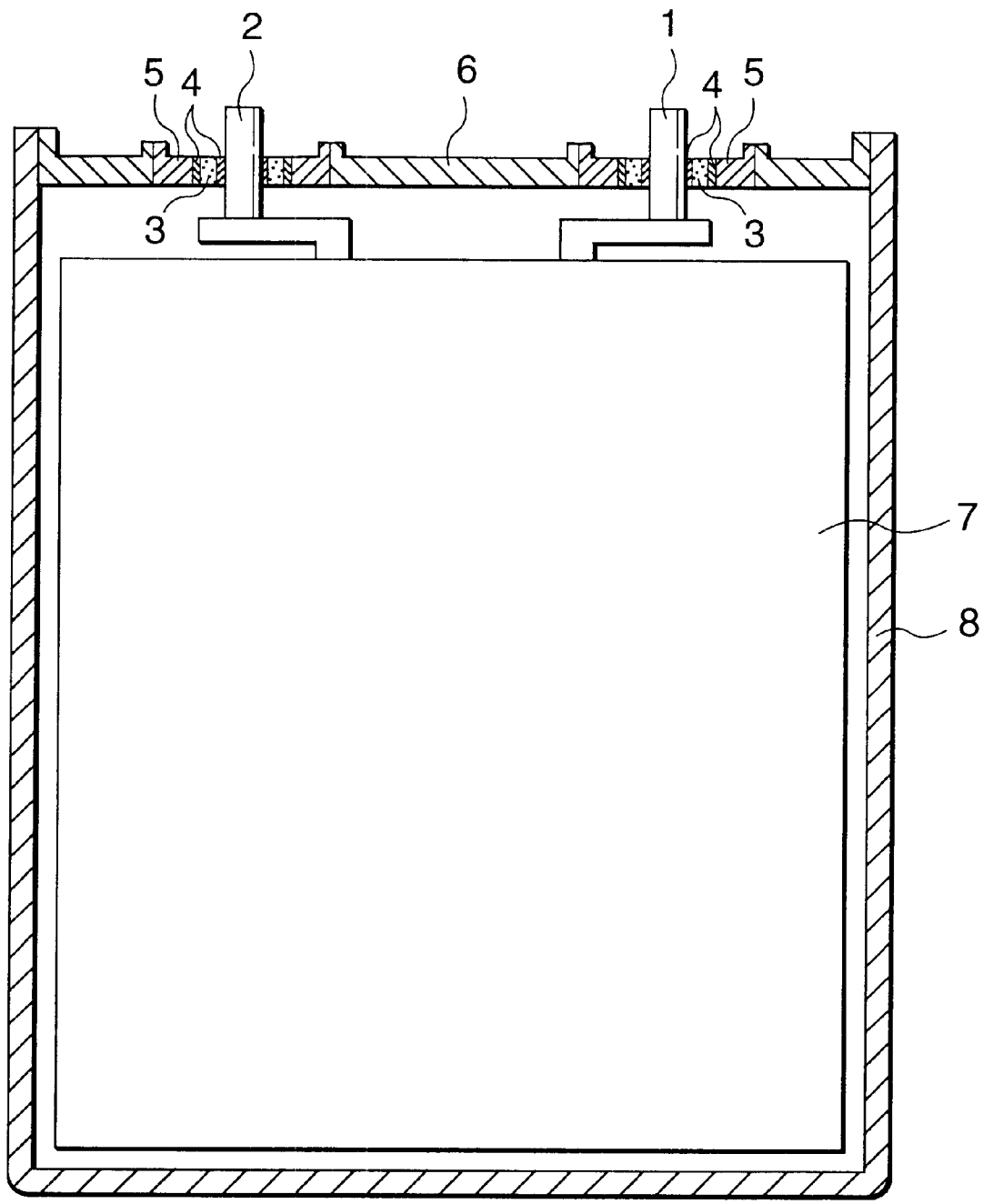
FIG. 4 is a vertical sectional view illustrating the structure of a nonaqueous electrolyte battery comprising a ceramic hermetic seal illustrating a conventional example.

In the secondary nonaqueous electrolyte battery of this embodiment, an electricity-generating element 7 is contained in a metallic container 8, and a metallic cover 6 is fitted into and sealed by welding to the upper opening of the metallic container 8 in the same arrangement as shown in FIG. 4. As shown in FIG. 3, the external annular metallic members 5, 5 to which the foregoing positive electrode terminal 1 and negative electrode terminal 2 have been insulation-sealed are inserted into and sealed by welding to the respective opening in the metallic cover 6 as shown in FIG. 3. During this procedure, the positive electrode terminal 1 and the negative electrode terminal 2 are connected to the positive electrode and the negative electrode of the electricity-generating element 7, respectively, at the lower end thereof. A nonaqueous electrolyte is injected into the interior of the metallic container 8. The metallic cover 6 and metallic container 8 can be made of aluminum or aluminum alloy to have a reduced weight. Similarly, the external annular member 5 is made of aluminum or aluminum alloy herein.

The first primary part of the present invention that the negative electrode terminal and the ceramic material are fixed to each other with filler materials for brazing mainly composed of copper will be further described hereinafter.

The negative electrode terminal 2 is a copper or copper alloy pin in one embodiment but may be made of nickel or nickel alloy. The ceramic material 3 is made of alumina or a material mainly composed of alumina. The negative electrode terminal 2 is inserted in the opening in the external annular metallic member 5 with an annular ceramic material 3 fitted thereon as shown in FIG. 2. The negative electrode terminal 2 is insulation-sealed and fixed to the ceramic material 3 with filler materials for brazing 4. The ceramic material 3 is insulation-sealed to the external annular metallic member 5 with filler materials for brazing 4. As the filler materials for brazing 4 with which the negative electrode terminal 2 and the ceramic material 3 are brazed to each other, there is used one mainly composed of copper. Preferred examples of a second component to be incorporated other than copper include gold, silver, and zinc. Particularly preferred among these metal components is zinc from the standpoint of reduction of copper content. As the filler materials for brazing 4 with which the ceramic material 3 and the external annular metallic member 5 are brazed to each other, there may be used a filler material made of other metals. If the external annular metallic member 5 is made of aluminum or aluminum alloy as in the present embodiment, an aluminum filler material is preferably used.

Some filler materials (according to JIS) including BCu-1 (practically pure copper filler material), BAu-1 (gold filler material having a copper content of about 63%), BAg-8 (silver-copper filler material having a copper content of about 28%) and BAu-4 (gold filler material having a copper content of about 18%), were measured for the presence of corrosion current at lithium potential by cyclic voltammetry. As a result, BCu-1 showed no corrosion current, but the other filler materials showed corrosion current. The corrosion current increased in the order of BAu-1, BAg-8 and BAu-1, demonstrating that the greater the copper content is, the less is the corrosion current. These filler materials were each kept in the form of rod at an ambient temperature of 60° C. with lithium short-circuited thereto for 1 week, and then observed for the conditions of the surface thereof. As a result, BAg-8 and BAu-4, which have a small copper content, were observed to have vigorous corrosion or crack and thus judged unsuitable for practical use. BCu-1, which is a practically pure copper filler material, showed no corrosion. BAu-1, which has a high copper content, showed a slight corrosion but underwent not crack. Thus, BCu-1 and BAu-1 were judged suitable for practical use. Secondary nonaqueous electrolyte batteries using the ceramic material 3 brazed thereto with BCu-1 and BAu-1, which had thus been judged suitable for practical use, as filler materials for brazing 4 were prepared, and then repeatedly charged and discharged. As a result, none of these batteries showed corrosion that causes practical problems.

For cyclic voltammetry, an electrolyte obtained by dissolving $LiPF_6$ in a 2:2:1 mixture of EC (ethylene carbonate), DMC (dimethyl carbonate) and DEC (diethyl carbonate) in an amount of 1 mol was used. For the foregoing measurement of corrosion current and the preparation of batteries, the same electrolyte was used. As the active positive electrode material to be incorporated in the batteries thus prepared there was used $LiCo_2$. As the active negative electrode material, there was used graphite. The batteries thus prepared are in the form of elliptic cylindrical spirally-wound secondary nonaqueous electrolyte battery as shown in FIGS. 3 and 4.

Judging from the previously stated conventional knowledge that a silver filler material having a copper content of from 15 to 40% or a silver-copper filler material corrodes and the foregoing experimental results in combination, the filler material mainly composed of copper preferably has a copper content of not less than 50%, more preferably not less than 60%, even more preferably not less than 85%.

In accordance with the foregoing structure of secondary nonaqueous electrolyte battery, the use of a filler material mainly composed of copper as filler materials for brazing coming in contact with the negative electrode terminal 2 makes it difficult for the filler materials for brazing to undergo alloying reaction with lithium when brought into contact with the nonaqueous electrolyte. Accordingly, it is possible to prevent metal corrosion that can cause fatal air leakage.

The present embodiment has been described with reference to the case where the negative electrode terminal 2 is insulation-sealed and fixed to the external annular metallic member 5 with the ceramic material 3 provided interposed therebetween. However, the negative electrode terminal 2 may be insulation-sealed and fixed to any metallic exterior member constituting the battery case.

The second primary part of the present invention that the positive electrode terminal and the ceramic material are fixed to each other with an aluminum alloy-based filler material will be further described hereinafter.

An example of the positive electrode terminal 1 is an aluminum or aluminum alloy pin. The ceramic material 3 is preferably made of alumina or a material mainly composed of alumina. The positive electrode terminal 1 is inserted in the opening in the external annular member 5 with an annular ceramic material 3 fitted thereon as shown in FIG. 1. The positive electrode terminal 1 and the ceramic material 3 are brazed to each other with the filler materials for brazing 4 so that they are insulation-sealed to each other. Similarly, the ceramic material 3 and the opening are brazed to each other with the filler materials for brazing 4 so that they are insulation-sealed to each other. As at least the filler materials for brazing 4 with which the positive electrode terminal 1 and the ceramic material 3 are brazed to each other, there is used an aluminum alloy based filler material. Such an aluminum alloy based filler material is a filler material made of an alloy mainly composed of aluminum. The aluminum alloy based filler material employable herein preferably has an aluminum content of not less than 85%. For example, an aluminum alloy based filler material comprising from 6.8 to 7.8% of silicon (Si), from 2 to 3% of magnesium (Mg) and the balance of aluminum (Al) with a slight amount of iron (Fe), copper (Cu), manganese (Mn) and chromium (Cr) is appropriate. In other words, an aluminum alloy containing silicon (Si) and magnesium (Mg) in an amount such that the relationship Si>Mg>1.0% is satisfied is desirable. Alternatively, Al-Si-based filler materials such as JIS BA4145 (Si content: 9.3 to 10.7%) and JIS BA4047 (Si content: 11.0 to 13.0%) may be used. The ceramic material 3 may be brazed to the external annular metallic member 5 with other filler materials for brazing materials. However, the foregoing aluminum alloy based filler material is used in the present embodiment.

In accordance with the foregoing structure of the secondary nonaqueous electrolyte battery, the filler materials for brazing 4 coming in contact with the positive electrode terminal 1 is an aluminum alloy based filler material. Thus, even if the positive electrode terminal 1 is at a high potential, the filler material can be prevented from corroding due to dissolution reaction. The positive electrode terminal 1 itself can be made of aluminum or aluminum alloy to prevent itself from corroding due to dissolution reaction. This arrangement is particularly effective for secondary nonaqueous electrolyte battery which exhibits a potential as high as not lower than 3 V vs $Li/Li^+$, even not lower than 3.5 V vs. $Li/Li^+$ (e.g., 3.95 V), at the positive electrode terminal 1.

The present embodiment has been described with reference to the case where the positive electrode terminal 1 is insulation-sealed and fixed to the external annular metallic member 5 with the ceramic material 3 provided interposed therebetween. However, the positive electrode terminal 1 may be insulation-sealed and fixed to any metallic exterior member constituting the battery case.

The third primary part of the present invention that the filler materials for brazing is coated with a coating material on the surface thereof exposed to the interior of the battery will be described hereinafter.

The use of the positive electrode terminal, negative electrode terminal and filler materials for brazings therefor as the first and second primary part of the present invention makes it possible to fairly prevent the corrosion of filler materials for brazing due to contact with the nonaqueous electrolyte. For example, if the filler materials for brazing for negative electrode terminal has a high copper content, it exhibits a high melting point. Hence, a workability is deteriorated, and occasionally it is made difficult to provide filler materials for brazing ideal for countermeasure against corrosion from the standpoint of fixing of terminal to ceramic material. Further, it is occasionally requested that the desired battery performance be maintained over a period of time as long as not less than 10 years depending on the purpose. Thus, an elaborate countermeasure must be made against corrosion. Accordingly, the filler materials for brazing can be coated with a coating material on the surface thereof exposed to the interior of the battery to make perfection more perfect for prevention of corrosion.

Figure 5:
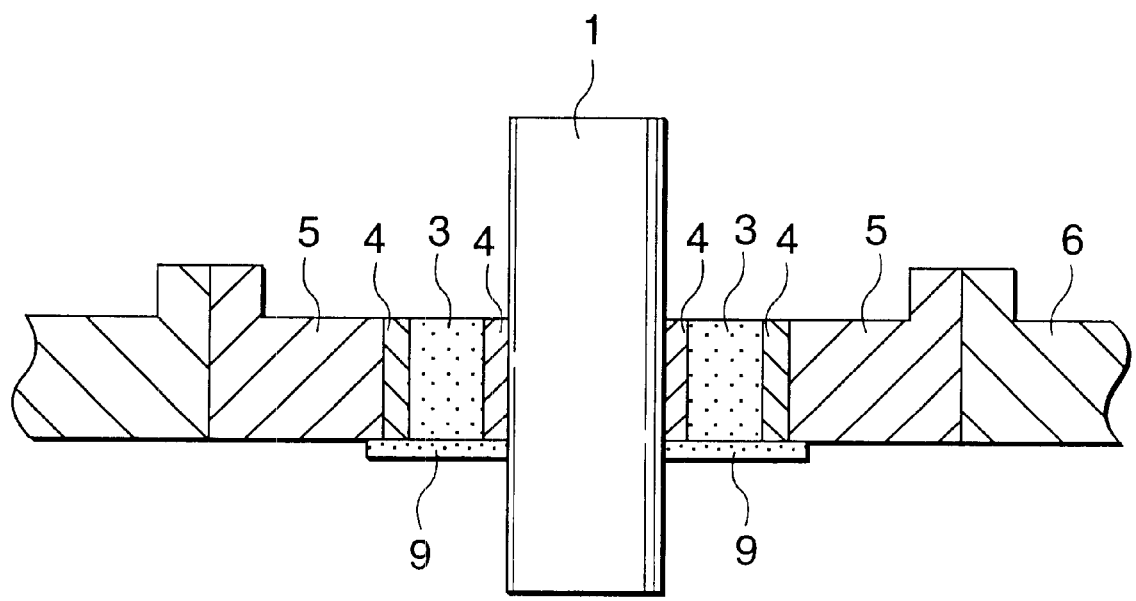
FIG. 5 is a partially enlarged sectional view of the positive electrode terminal of a secondary nonaqueous electrolyte battery illustrating an embodiment of the coating material of the present invention.
Figure 6:
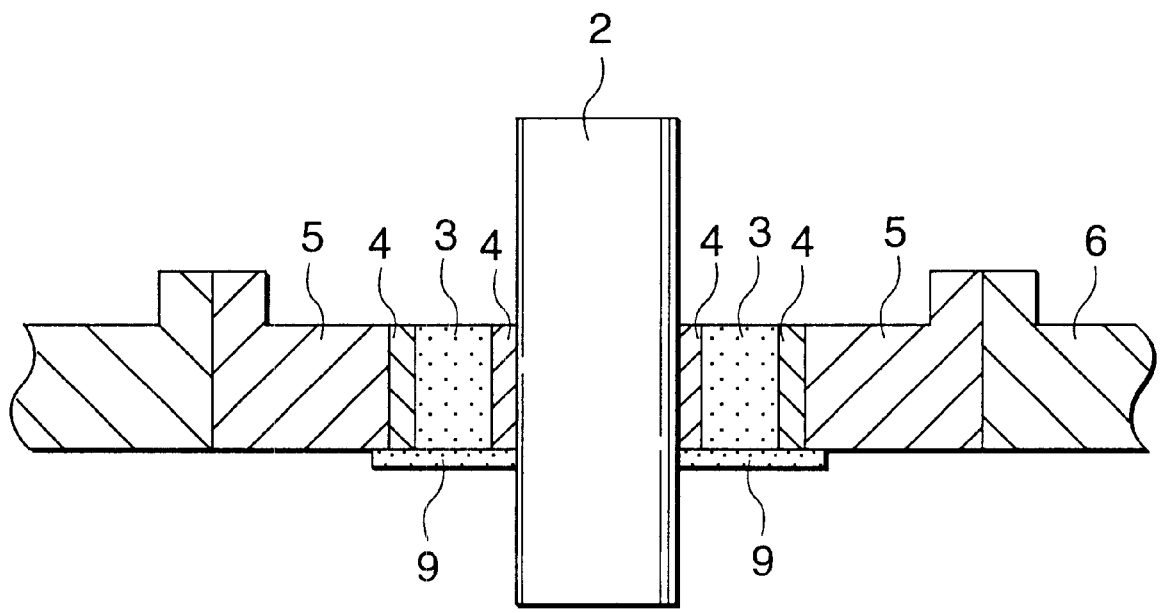
FIG. 6 is a partially enlarged sectional view of the negative electrode terminal of a secondary nonaqueous electrolyte battery illustrating an embodiment of the coating material of the present invention.

FIGS. 3, 5 and 6 each illustrate a second embodiment of the present invention. FIG. 5 is a partially enlarged sectional view of the positive electrode terminal of a secondary nonaqueous electrolyte battery. FIG. 6 is a partially enlarged sectional view of the negative electrode terminal of a secondary nonaqueous electrolyte battery. Like numerals are used where the constituent members function in the same way as those of FIG. 4, which illustrates a conventional nonaqueous electrolyte battery.

This embodiment of the present invention will be described with reference to a secondary nonaqueous electrolyte battery having a ceramic material 3 insulation-sealed with filler materials for brazing 4 between an external annular metallic member 5 fitted in the metallic cover 6 of the battery case and the positive electrode terminal metallic pin 1 and negative electrode terminal metallic pin 2 as shown in FIG. 4. The external annular metallic member 5 is insulation-sealed and fixed to the metallic cover 6 by inserting metallic pin terminals 1 and 2 on which an annular ceramic material 3 has been fitted into the opening, and then brazing the metallic pin terminals 1, 2 to the ceramic material 3 and the ceramic material 3 to the opening with filler materials for brazing 4 as shown in FIG. 3. The external annular metallic members 5, 5 are made of aluminum, aluminum alloy or the like. The positive electrode metallic pin terminal 1 is preferably made of aluminum, aluminum alloy or the like. The negative electrode metallic pin terminal 2 is preferably made of copper, copper alloy, nickel or nickel alloy.

A layer of coating material 9 is formed on the other side (lower surface in FIGS. 5 and 6) of the external annular metallic member 5 to cover the exposed surface of the filler materials for brazing 4, 4. As the coating material 9, there may be used any material which can cover the exposed surface of the filler materials for brazing 4, 4 to prevent the penetration of the nonaqueous electrolyte.

As the coating material 9, there may be used a ceramic, polymer or polysaccharide which does not belong to polymer. Preferably, ceramic or polymer is used.

As such a polymer, there may be used any one of thermoplastic polymers, cold-setting polymers and thermosetting polymers. These polymers may be used singly or in admixture. Preferred among these polymers are those which can be difficulty dissolved in or can difficultly swell with a nonaqueous electrolyte, particularly nonaqueous electrolyte solution. Examples of such a polymer employable herein include polyimide resin, epoxy resin, polyethylene, polypropylene, polyethylene terephthalate, polyphenylene sulfide, phenolic resin, butyl rubber, ethylene propylenediene rubber, and styrene butadiene rubber. Preferred among these polymers is epoxy resin.

More preferably, a metallic film may be used as the coating material 9. In some detail, a metal film can be easily formed on the filler materials for brazing by passing electric current through the filler materials for brazing. Thus, the effectiveness of the metal film as a coating material can be confirmed. The metal film is effective as a coating material regardless of which it is formed by plating or other methods such as vacuum evaporation.

Particularly preferred examples of the metal film include Ni and Cu. If the coating layer is formed by plating, it is more effective to form on the coating layer a coating layer of the foregoing polymer. The polymer coating layer can be formed by coating or spraying. The ceramic coating layer can be formed by flame spraying. If ceramic is used, it is more effective to coat on the ceramic coating layer a polymer coating layer or use a ceramic having a polymer incorporated therein. Both the two methods may be effected.

Referring to the assembly of the present embodiment of the secondary nonaqueous electrolyte battery, the metallic cover 6 is fitted in the metallic container 8 containing the electricity-generating element 7, and then sealed by welding thereto to form a battery case as shown in FIG. 4. Subsequently, as shown in FIG. 3, the external annular metallic members 5, 5 are fitted in the respective opening in the metallic cover 6, and then sealed by welding thereto. During this procedure, the metallic pin terminals 1, 2 are connected to the positive and negative electrodes of the electricity-generating element 7, respectively, at the lower end thereof. A nonaqueous electrolyte is then injected into the metallic container 8. The metallic cover 6 and the metallic container 8 can be made of aluminum or aluminum alloy to have a reduced weight.

In accordance with the foregoing structure of the secondary nonaqueous electrolyte battery, the filler materials for brazing 4, 4 is coated with the coating material 9 on the side thereof exposed to the other side of the external annular metallic member 5. Accordingly, the nonaqueous electrolyte which has been injected into the metallic container 8 does not come in direct contact with the filler materials for brazing 4, 4. Accordingly, it is possible to prevent corrosion by the nonaqueous electrolyte. Such corrosion by a nonaqueous electrolyte can occur at any point in the vicinity of the positive and negative electrode metallic pin terminals 1, 2. However, if the nonaqueous electrolyte battery exhibits a low voltage, little or no corrosion occurs in the vicinity of the positive electrode metallic pin terminal 1. Thus, the layer of coating material 9 can cover only the filler materials for brazing 4 in the vicinity of the negative electrode metallic pin terminal 2. However, when the positive electrode exhibits a potential of not lower than 3 V, particularly not lower than 3.5 V, e.g., if the battery voltage is about 3.95 V, corrosion occurs in the vicinity of the positive electrode metallic pin terminal 1. Thus, it is necessary that the layer of coating material 9 be formed covering the filler materials for brazing 4 at least on the side thereof exposed to the positive electrode metallic pin terminal 1.

Secondary nonaqueous electrolyte batteries of comparative examples and examples with a capacity of 100 Ah using a battery case consisting of a metallic container 8 made of aluminum and a metallic cover 6 made of aluminum were charged at a constant current and a constant voltage of 50 A and 4.1 V at 25° C. for 4 hours, and then discharged at a constant current of 50 A to 2.75 V. This charge-discharge cycle was repeated. The results of test are set forth in Table 1.

TABLE 1

|  | Comparative Example | Example 1 | Example 2 | Example 3 | Example 4 (Ni-plated) |
| --- | --- | --- | --- | --- | --- |
| Airtightness | Air leakage | Some air leakage | Some air leakage | No air leakage | No air leakage |
| Cycle life | 810 | 1,350 | 1,200 | 1,450 | 1,500 |

The foregoing battery is in the form of elliptic cylindrical spirally-wound battery using $LiCo_2$ as an active positive electrode material, artificial graphite as an active negative electrode material and a solution obtained by dissolving $LiPF_6$ in a 2:2:1 mixture of EC (ethylene carbonate), DMC (dimethyl carbonate) and DEC (diethyl carbonate) in an amount of 1 mol as an electrolyte.

In Comparative Example, the coating material 9 for covering the filler materials for brazing 4,4 was not formed. In Example 1, the coating material 9 was formed by applying a polyimide as thermosetting resin, and the heating the coat. In Example 2, the coating material 9 was formed by flame-spraying a ceramic mainly composed of alumina. In Example 3, the coating material 9 was formed by flame-spraying the foregoing ceramic having a polyimide incorporated therein. As can be seen in Table 1, the battery of Comparative Example showed air leakage and a reduced cycle life. On the other hand, the batteries of Examples 1 and 2 showed some air leakage but exhibited a prolonged cycle life. The battery of Example 3 showed no air leakage and an even longer cycle life. In Example 4, Ni was electro-deposited on the filler materials for brazing to act as a coating material for the filler materials for brazing. The battery of Example 4 showed no air leakage and an even longer cycle life, demonstrating that such a metal film is effective as a coating material.

The second embodiment of the present invention has been described with reference to the case where the entire filler materials for brazing 4, 4 provided inside and outside the ceramic material 3 is coated with the coating material 9. In actuality, however, corrosion occurs mostly at the point in contact with the positive and negative electrodes. Thus, the coating material 9 may be formed covering the filler materials for brazing 4 only on the side thereof exposed to the interior of the battery where the filler materials for brazing 4 comes in direct contact with the metallic pin terminals 1, 2.

The foregoing first and second embodiments of the present invention have been described with reference to the case where the metallic pin terminals 1, 2 are insulation-sealed to the metallic cover 6 or external annular metallic member 5. However, the metallic pin terminals 1, 2 may be fixed to any metallic exterior members constituting the battery case.

As can be seen in the foregoing description, in accordance with the nonaqueous electrolyte battery of the present invention, the use of a filler material mainly composed of copper as filler materials for brazing coming in contact with the negative electrode terminal makes it difficult to cause corrosion due to the alloying reaction with an alkaline metal such as lithium. Further, the use of an aluminum alloy based filler material as filler materials for brazing coming in contact with the positive electrode terminal makes it possible to prevent corrosion due to the dissolution reaction of the filler material and hence prevent the reduction of cycle life and calendar life due to air leakage. In particular, the use of an aluminum alloy filler material having a high aluminum content makes it possible to prevent the dissolution reaction of the filler material more securely.

Further, in accordance with the present invention, the coating of the sealing material of filler materials for brazing with a coating material on the side thereof exposed to the interior of the battery makes it possible to prevent the sealing material from coming in contact with the nonaqueous electrolyte and hence prevent corrosion even more securely.

What is claimed is:
1. A nonaqueous electrolyte battery comprising:
   a negative electrode terminal fixed to an insulating ceramic material with filler materials for brazing mainly composed of copper and insulation-sealed to an opening of a metallic exterior member with the ceramic material being provided interposed therebetween; and
   a positive electrode terminal fixed to an insulating ceramic material with an aluminum alloy-based filler material and insulation-sealed to the opening in the metallic exterior member.

2. The nonaqueous electrolyte battery according to claim 1, wherein the filler materials for brazing mainly composed of copper has a copper content of not less than 50%.

3. The nonaqueous electrolyte battery according to claim 1, wherein the aluminum alloy-based filler material has an aluminum content of not less than 85%.

4. The nonaqueous electrolyte battery according to claim 1, wherein the negative electrode terminal is made of copper or copper alloy.

5. The nonaqueous electrolyte battery according to claim 1, wherein the negative electrode terminal is made of nickel or nickel alloy.

6. The nonaqueous electrolyte battery according to claim 1, wherein the positive electrode terminal is made of aluminium or aluminium alloy.

7. The nonaqueous electrolyte battery according to claim 1, wherein the filler materials for brazing is coated with a coating material on the surface thereof which is exposed to an interior of the battery.

8. The nonaqueous electrolyte battery according to claim 7, wherein the coating material is a polymer.

9. The nonaqueous electrolyte battery according to claim 7, wherein the coating material is a ceramic.

10. The nonaqueous electrolyte battery according to claim 7, wherein the coating material is a ceramic impregnated with a polymer.

11. The nonaqueous electrolyte battery according to claim 7, wherein the coating material is a ceramic coated with a polymer on the surface thereof.

12. The nonaqueous electrolyte battery according to claim 7, wherein the coating material is a metallic film.

13. The nonaqueous electrolyte battery according to claim 7, wherein the coating material is a metallic film formed by plating with Ni or Cu.

14. The nonaqueous electrolyte battery according to claim 7, wherein the coating material is prepared by coating with a resin and a metallic film formed by plating with Ni or Cu.

15. The nonaqueous electrolyte battery according to claim 1, wherein the filler materials for brazing mainly composed of copper has a copper content of not less than 60%.

16. A nonaqueous electrolyte battery comprising:
   a negative electrode terminal fixed to an insulating ceramic material with filler materials for brazing mainly composed of copper and insulation-sealed to an opening of a metallic exterior member, the ceramic material being provided interposed therebetween; and
   a positive electrode terminal.

17. The nonaqueous electrolyte battery according to claim 16, wherein the filler materials for brazing is coated with a coating material on the surface thereof which is exposed to an interior of the battery.

18. A nonaqueous electrolyte battery comprising:
   a negative electrode terminal; and
   a positive electrode terminal fixed to an insulating ceramic material with an aluminum alloy-based filler materials for brazing and insulation-sealed to the opening in the metallic exterior member.

19. The nonaqueous electrolyte battery according to claim 18, wherein the filler materials for brazing is coated with a coating material on the surface thereof which is exposed to an interior of the battery.

* * * * *